United States Patent Office 2,983,641
Patented May 9, 1961

2,983,641

FOIL ADHESIVE SYSTEM

David L. McConaughy, Penn Township, Allegheny County, Pa., assignor, by mesne assignments, to American-Marietta Company, Stoner-Mudge Co. Division, Chicago, Ill., a corporation of Illinois No Drawing. Filed Mar. 16, 1956, Ser. No. 572,116

9 Claims. (Cl. 154—129)

This invention relates to the heat sealing of adhesive between metal foil, to the resultant laminate, and to the adhesive composition therefor, and has particular application to aluminum foil which is wrapped around food items, small machinery parts, and the like, and is then sealed by applying heat and pressure to bond adhesive which has been coated between superimposed layers of the foil.

It is customary to coat foil for such purposes with an adhesive composition to a film weight of about 2.0–2.5 milligrams per square inch, and then to bake the coated foil for about 10–15 seconds at about 400–500° F. (referring to oven temperature). The foil is subsequently wound in rolls, and thereafter is usually shipped and stored before being unwound and used to package various articles. The packaging operation usually involves cutting the foil into separate sheets, sandwiching the articles to be packaged between two sheets, with their adhesive-coated areas facing each other, and applying heat and pressure to the overlapping edges of the sheets until the adhesive bonds the sheets together. Such bonding is usually accomplished by applying pressure of about 20 to about 60 pounds per square inch at a platen temperature of about 200° F to about 400° F for about 1 to about 10 seconds. The amount of pressure is not critical, and the temperature varies inversely with the time.

Various adhesives have been tried for the purpose, and some of the vinyl resins give useful results. However, unmodified vinyl adhesive compositions require relatively high sealing temperatures (over about 225° F. platen temperature at 5 seconds) to achieve a good bond, and using a plasticizer to modify the vinyl adhesive composition to lower its bonding temperature has the unfortunate effect of tending to cause a premature bond, known as "blocking," at temperatures of about 120 to about 130° F. at pressures of about 0.5 to about 1.0 pound per square inch.

In accordance with the present invention a foil adhesive is provided which is usable in presently standard commercial packaging equipment, to give a stronger bond, and improved resistance to blocking.

The composition of the invention has as its essential components (1) a resin which is adhesive under heat and pressure of about 200° F. at about 20 pounds per square inch, (2) a plasticizer for the resin, and (3) inert particles. In addition to these components, a volatile organic solvent is preferably used to reduce viscosity of the composition for purpose of facilitating the coating of the composition on the foil. After the composition has been applied to the foil, it is baked at about 400° F. to about 500° F. for about 10 to about 15 seconds, in order to drive off the solvent before the coated foil is wound into rolls. For the purposes of the invention, the proportion of the resin component ranges from about 60% to about 80% of the combined weight of the resin and plasticizer components, the balance being the plasticizer, and the proportion of the component of inert particle ranges from about 1% to about 20% of the combined weight of the resin, plasticizer and inert particle components.

The resin component of the composition of the invention has as its essential constituent, one or a mixture of copolymers of (1) a vinyl halide, preferably vinyl chloride; (2) a vinyl ester of a lower saturated fatty acid, preferably vinyl acetate; and (3) an aliphatic alpha, beta-mono-olefinic carboxylic acid, preferably maleic acid, the amount of carboxylic acid combined in the copolymer being between about 0.1% to about 4% by weight of the whole copolymer, and the carboxyl groups in the copolymer being substantially unreacted. The optimum amount of maleic acid, when it is used as the third component of the copolymer, is about 0.3% to about 3% by weight of the total copolymer. The proportion of the vinyl halide component (1) in the copolymer is in the range of about 60% to about 95% by weight of the total copolymer, the balance being the said components (2) and (3) of the copolymer. The present preferred example of the essential constituent of the resin component is a copolymer of vinyl chloride, vinyl acetate and maleic acid in proportions by weight of about 86/13/1, as exemplified by "VMCH" of Bakelite Company, Union Carbide and Carbon Corp., of New York, N.Y.

The resin component of the composition of the invention consists of between about 50% by weight to 100% by weight of the above-described essential constituent copolymer, the balance being one or more other vinyl polymers or copolymers which are compatible with said essential constituent, as evidenced by clarity of a solution of the mixed resin component. Copolymers of vinyl chloride and vinyl acetate are suitable for such compatible mixtures; e.g., copolymers of vinyl chloride and vinyl acetate in proportions by weight of 87/13, which are exemplified by "VYLF" and the higher molecular weight "VYHH," both of Bakelite Company, Union Carbide and Carbon Corp.. New York, N.Y. When the proportion of the essential constituent is about 50% or more by weight of the total resin component, the characteristics of the composition are not adversely affected to any significant degree. Since the essential constituent is relatively expensive, a resin component consisting of equal parts by weight of the essential constituent and the compatible constituent represents an optimum balance of performance and economy.

The plasticizer component of the composition of the invention is any plasticizer for the resin component which boils above 200° C., and is fluid at about 25°C. (average room temperature). Such plasticizers are known in the art, and include one or a mixture of organic acid esters having such boiling and fluid characteristics; e.g., esters of phthalic acid such as di (2 ethyl hexyl) phthalate, di butoxyethyl phthalate and di ethoxyethyl phthalate; esters of adipic acid such as di butoxyethyl adipate and di methylcyclohexyl adipate; esters of sebacic acid such as di methoxyethyl sebacate; and esters of sulfonic acids such as o-cresyl p-toluene sulfonate. Of these plasticizers, di (2 ethyl hexyl) phthalate and o-cresyl p-toluene sulfonate are presently preferred.

The inert particles component of the composition of the invention is one or a mixture of materials which are non-reactive with the resin and plasticizer components, which are not softened by the plasticizer component, which are insoluble in the organic solvents used with the composition (e.g., methyl ethyl ketone), and which are in the form of small discrete solid particles which are thermally stable at temperatures up to at least 550° F. The particles may be finely divided or colloidal particles of silica (e.g., "Santocel C" of Monsanto Chemical Co., St. Louis, Mo.), bentonite derivatives (e.g., "Bentone 18" and "Bentone 34" of National Lead Company, New York, N.Y.), diatomaceous earth, china clay, slate flour, talc or carbon.

The solvent used to reduce viscosity of the composition for purposes of applying it to the foil is not critical for purposes of the invention, and may be selected from various active volatile organic solvents known in the art for use with the resin component of the invention; e.g., ketone solvents such as methyl ethyl ketone (preferred), and methyl isobutyl ketone, and ether alcohols, such as "Cellosolve" of Union Carbide and Carbon Corp., of New York, N.Y. These active solvents may be used singly or mixed, and may be used in conjunction with one or a mixture of less active solvent diluents, such as benzene, toluene and xylene. The solvent should be capable of being volatilized and baked out of the composition in about 10 seconds at about 400° F.

Other materials, such as waxes, dyes and thermal stabilizers, may be used in the composition of the invention, as additives or modifiers, as will be understood by those skilled in the art. The composition of the invention is suitable for bonding at a platen temperature of about 150° to about 500° F. for about ¼ second to about 10 seconds, the time generally varying inversely with the temperature.

The following Table I illustrates by examples the effect of varying the proportions of the three essential components of the invention. In each of the examples in Table I, the resin was a copolymer of vinyl chloride, vinyl acetate and maleic acid copolymer in proportions of about 86/13/1 ("VMCH"), the plasticizer was di (2 ethyl hexyl) phthalate, and the non-reactive particles component was silica aerogel ("Santocel C"). These components were dispersed in methyl ethyl ketone and were thoroughly intermixed in a dispersion mill. The resultant mixture was thinned with additional methyl ethyl ketone until the composition had a viscosity of 45–55 Krebs units at 77° F. (about 38% solids content in the mixture), and was applied to aluminum foil and baked for 10 seconds at 400° F., the final coating weight being approximately 2 milligrams per square inch.

TABLE I

*Effect of presence of plasticizer and inert particles in the composition*

|  | Examples | | | | |
|---|---|---|---|---|---|
|  | A | B | C | D | G |
| Components of adhesive composition (parts by weight): | | | | | |
| (1) Resin ("VMCH") | 100 | 80 | 90 | 95 | 70 |
| (2) Plasticizer (di (2 ethyl hexyl) phthalate) | 0 | 20 | 10 | 0 | 30 |
| (3) Inert particles ("Santocel C") | 0 | 0 | 0 | 5 | 7 |
| Required platen temp. in degrees F. for bonding in 5 seconds at 40 p.s.i. | 225 | 160 | 225 | 233 | 171 |
| Bond strength (pounds/inch width) | 0.80 | 1.70 | 1.31 | 0.70 | 2.64 |
| Blocking resistance (rated on scale of 0, complete blocking, to 10, no blocking): | | | | | |
| (a) Coating-to-coating | 10 | 4 | 9 | 10 | 9 |
| (b) Coating-to-foil | 10 | 4 | 10 | 10 | 10 |

In the above Table I, the bond strength was tested by bonding successive pairs of 1 inch wide foil strips together, under the stated conditions, along their mid-portions, and then folding the free end of one strip back 180°, and applying an observed tension on that end and the adjacent free end of the other strip, sufficient to pull the strips apart at a constant rate of 2 inches/minute. The blocking resistance was tested by observing the force required to pull pairs of foil strips apart after they had been subjeced to a pressure of about 0.5 pound per square inch at 130° F. for 24 hours, and rating the observed results on a scale of 0 (complete blocking, as evidenced by inseparability of strips even with a strong pull) to 10 (no blocking, as evidenced by complete lack of resistance to separation).

Tables II, III and IV are based on similar tests, as follows:

TABLE II

*Effect of varying proportions of inert particles in the composition*

|  | Examples | | | | | |
|---|---|---|---|---|---|---|
|  | E | F | G | H | J | K |
| Components of adhesive composition (parts by weight): | | | | | | |
| (1) Resin ("VMCH") | 70 | 70 | 70 | 70 | 70 | 70 |
| (2) Plasticizer (di (2 ethyl hexyl) phthalate) | 30 | 30 | 30 | 30 | 30 | 30 |
| (3) Inert particles ("Santocel C") | 0 | 6 | 7 | 8 | 10 | 20 |
| Required platen temp. in degrees F. for bonding in 5 seconds at 40 p.s.i. | 150 | 175 | 171 | 200 | 204 | 225 |
| Bond strength (pounds/inch width) | 1.00 | 2.69 | 2.64 | 2.27 | 2.50 | 2.60 |
| Blocking resistance (scale of 0, complete blocking, to 10, no blocking): | | | | | | |
| (a) Coating-to-coating | 2 | 6.5 | 9 | 9 | 9.5 | 10 |
| (b) Coating-to-foil | 2 | 8.5 | 10 | 10 | 10 | 10 |

TABLE III

*Effect of different species of inert particles*

|  | Examples | | | | | |
|---|---|---|---|---|---|---|
|  | B | L | M | N | P | R |
| Components of adhesive composition (parts by weight): | | | | | | |
| (1) Resin ("VMCH") | 80 | 80 | 80 | 80 | 80 | 80 |
| (2) Plasticizer (di (2 ethyl hexylphthalate) | 20 | 20 | 20 | 20 | 20 | 20 |
| (3) Inert particles: | | | | | | |
| (a) Parts | 0 | 5 | 5 | 5 | 5 | 5 |
| (b) Species |  | (1) | (2) | (3) | (4) | (5) |
| Required platen temp. in degrees F. for bonding in 5 seconds at 40 p.s.i. | 160 | 173 | 195 | 168 | 222 | 192 |
| Bond strength (pounds/inch width) | 1.70 | 1.37 | 1.88 | 2.33 | 1.58 | 2.47 |
| Blocking resistance (scale of 0, complete blocking, to 10, no blocking): | | | | | | |
| (a) Coating-to-coating | 4 | 9.5 | 8 | 9 | 10 | 7 |
| (b) Coating-to-foil | 4 | 10 | 10 | 10 | 10 | 9 |

[1] "Silica Gel."
[2] China Clay.
[3] "Santocel C."
[4] Activated carbon.
[5] "Bentone 34."

TABLE IV

*Effect of different species of plasticizers*

|  | Examples | | |
|---|---|---|---|
|  | G | S | T |
| Components of adhesive composition: | | | |
| (1) Resin: | | | |
| (a) Parts by weight | 70 | 35 and 35 | 70 |
| (b) Species | "VMCH" | "VMCH" and "VYHH." | "VMCH." |
| (2) Plasticizer: | | | |
| (a) Parts by weight | 30 | 30 | 30 |
| (b) Species | DOP | DOP | "Santicizer 10." |
| (3) Inert particles: | | | |
| (a) Parts by weight | 7 | 7 | 7 |
| (b) Species | "Santocel C." | "Santocel C." | "Santocel C." |
| Required platen temp. in degrees F. for bonding in 5 seconds at 40 p.s.i. | 171 | 170 | 180 |
| Bond strength (pounds/inch width) | 2.64 | 2.50 | 2.55 |
| Blocking resistance (scale of 0, complete blocking, to 10, no blocking): | | | |
| (a) Coating-to-coating | 9 | 9 | 9 |
| (b) Coating-to-foil | 10 | 10 | 10 |

In the above Table IV, DOP is an abbreviation of di (2 ethyl hexyl) phthalate, and "Santicizer 10" is o-cresyl p-toluene sulfonate sold by Monsanto Chemical Co., St. Louis, Mo. The other designations have been described above.

While I have described present preferred embodiments of the invention and methods of practicing the same, it will be recognized that the invention is not limited thereto but may be otherwise variously embodied and practiced within the scope of the following claims.

I claim:

1. A process of bonding metal foil, comprising the steps of providing metal foil coated with an adhesive composition resistant to premature bonding, and subsequently superimposing pieces of foil with said coating therebetween and bonding them together by the application of heat and pressure, said adhesive composition having (1) a resin component, (2) a plasticizer component, and (3) a component of inert particles, said resin component (1) consisting of a first material comprising solvent-soluble copolymers of a vinyl halide, a vinyl ester of a lower saturated fatty acid, and an aliphatic alpha, beta-mono-olefinic carboxylic acid, the amount of carboxylic acid combined in the copolymer being between about 0.1% and about 4% by weight of the polymer and the carboxyl groups in the polymer being substantially unreacted, said first material constituting about 50% to 100% by weight of the resin component (1), the balance of resin component (1) being a vinyl polymeric material compatible with said first material as evidenced by clarity of a solution of a mixture of said materials; said plasticizer component (2) consisting of a plasticizer for the resin component (1) which has a boiling point above 200° C., and is fluid at about 25° C., and said component (3) consisting of small discrete particles of silica aerogel which is not chemically or physically altered by intermixture with the other two components, the proportion by weight of the resin component being 60% to 80% of the combined weight of the resin and plasticizer components (1) and (2), the balance of said combined weight being the plasticizer component (2), and the proportion of the said component (3) being 1% to 20% of the combined weight of the said components (1), (2) and (3).

2. The process of claim 1 in which the said first material in the resin component (1) consists of a copolymer of vinyl chloride, vinyl acetate, and maleic acid.

3. The process of claim 1 in which the said first material in the resin component (1) consists of a copolymer of vinyl chloride, vinyl acetate and maleic acid, in proportions by weight in the copolymer of about 86%, about 13% and about 1%, respectively.

4. The process of claim 1 in which the plasticizer component (2) is a hydrocarbon ester of an acid selected from the group consisting of adipic acid, sebacic acid, sulfonic acid and mixtures thereof.

5. The process of claim 1 in which the plasticizer component (2) consists of di (2 ethyl hexyl) phthalate.

6. The process of claim 1 in which the foil is aluminum.

7. A process of bonding aluminum foil, comprising the steps of providing aluminum foil coated with an adhesive composition resistant to premature bonding, and subsequently superimposing pieces of said foil with said coating therebetween and applying a pressure of 20 to 60 pounds per square inch at 150° to 500° F. for a quarter of a second to ten seconds to bond the superimposed pieces of foil together, said adhesive composition having (1) a resin component, (2) a plasticizer component, and (3) a component of inert particles, said resin component (1) consisting of a solvent-soluble copolymer of vinyl chloride, vinyl acetate and maleic acid in proportions by weight of about 86%, 13% and 1%, respectively; said plasticizer component (2) consisting of di (2 ethyl hexyl) phthalate; and said component (3) consisting of small discrete particles of silica aerogel which is not chemically or physically altered by mixture with the other two components, the proportion by weight of the resin component (1) being 60% to 80% of the combined weight of the resin and plasticizer components (1) and (2), the balance of said combined weight being the plasticizer component (2), and the proportion of the said component (3) being 1% to 20% of the combined weight of the components (1), (2) and (3).

8. Metal foil coated with an adhesive composition resistant to premature bonding, and adapted to permit pieces of coated foil to be superimposed with said coating therebetween and bonded together by the application of heat and pressure, said adhesive composition having (1) a resin component, (2) a plasticizer component, and (3) a component of inert particles, said resin component (1) consisting of a first material comprising solvent soluble copolymers of a vinyl halide, a vinyl ester of a lower saturated fatty acid, and an aliphatic alpha, beta-mono-olefinic carboxylic acid, the amount of carboxylic acid combined in the copolymer being between about 0.1% and about 4% by weight of the polymer and the carboxyl groups in the polymer being substantially unreacted, said first material constituting about 50% to 100% by weight of the resin component (1), the balance of resin component (1) being a vinyl polymeric material compatible with said first material as evidenced by clarity of a solution of a mixture of said materials; said plasticizer component (2) consisting of a plasticizer for the resin component (1) which has a boiling point above 200° C., and is fluid at about 25° C., and said component (3) consisting of small discrete particles of silica aerogel which is not chemically or physically altered by intermixture with the other two components, the proportion by weight of the resin component being 60% to 80% of the combined weight of the resin and plasticizer components (1) and (2), the balance of said combined weight being the plasticizer component (2), and the proportion of the said component (3) being 1% to 20% of the combined weight of the said components (1), (2) and (3).

9. Coated foil as recited in claim 8 in which said metal foil is aluminum foil.

References Cited in the file of this patent

UNITED STATES PATENTS

| | | |
|---|---|---|
| 2,149,732 | Goff | Mar. 7, 1939 |
| 2,329,456 | Campbell | Sept. 14, 1943 |
| 2,423,870 | Blessing | July 15, 1947 |
| 2,427,513 | Spessard | Sept. 16, 1947 |
| 2,467,340 | Seymour | Apr. 12, 1949 |
| 2,676,943 | Carson | Apr. 27, 1954 |
| 2,708,289 | Collings | May 17, 1955 |

OTHER REFERENCES

"Plasticizers," by D. H. Buttrey, published by Cleaver-Hume Press Ltd., London, 1950, page 107.